United States Patent
Tat et al.

(10) Patent No.: US 8,576,901 B2
(45) Date of Patent: Nov. 5, 2013

(54) MODEM AND METHOD OF OPERATING A WIRELESS DEVICE

(75) Inventors: Nguyen Quan Tat, Reading (GB); Stuart Ian Geary, Fleet (GB); Jari Juhani Ruohonen, Tampere (FI); Andrew Bishop, Guildford (GB); Sami Jutila, Oulu (FI); Alexander Graham Charles, Fleet (GB); Roy Hansen, Dragør (DK)

(73) Assignee: Renesas Mobile Corporation, Tokyo (JP), `

( * ) Notice: Subject to any disclaimer, the term of this patent is extended or adjusted under 35 U.S.C. 154(b) by 0 days.

(21) Appl. No.: 13/408,186

(22) Filed: Feb. 29, 2012

(65) Prior Publication Data

US 2013/0156081 A1 Jun. 20, 2013

(30) Foreign Application Priority Data

Dec. 20, 2011 (GB) .................................. 1121894.8

(51) Int. Cl.
*H04B 1/38* (2006.01)

(52) U.S. Cl.
USPC ........... 375/222; 375/219; 375/220; 375/267; 375/295; 375/299; 455/101; 455/132; 455/412.1; 455/422.1; 455/424; 455/500; 455/551; 455/552.1; 455/558; 455/562.1; 370/334; 341/173

(58) Field of Classification Search
USPC ................. 375/219, 220, 222, 267, 295, 299; 455/101, 132, 412.1, 422.1, 424, 500, 455/551, 552.1, 562.1, 558; 370/334; 341/173
See application file for complete search history.

(56) References Cited

U.S. PATENT DOCUMENTS

| | | | |
|---|---|---|---|
| 7,912,497 | B2 | 3/2011 | Isidore et al. |
| 2009/0131054 | A1 | 5/2009 | Zhang |
| 2010/0240414 | A1 | 9/2010 | Lotenberg |
| 2011/0117909 | A1 | 5/2011 | Cao |

(Continued)

FOREIGN PATENT DOCUMENTS

| | | |
|---|---|---|
| EP | 0 941 002 A2 | 9/1999 |
| EP | 2 227 049 A1 | 9/2010 |

(Continued)

OTHER PUBLICATIONS

UKIPO Search Report under Section 17 dated May 4, 2012 issued in a related British Application No. GB1121894.8 (1 page).

(Continued)

*Primary Examiner* — Leon Flores
(74) *Attorney, Agent, or Firm* — Lucas & Mercanti, LLP; Robert P. Michal (57) ABSTRACT

A modem is provided for a wireless device that is capable of providing service for at least two SIMs. The modem has at least a first set of modem components and a second set of modem components. The modem selectively reconfigures the arrangement of the plural sets of modem components. In a first configuration, the first set of modem components provides wireless connection service for a first SIM of the wireless device and the second set of modem components provides wireless connection service for a second SIM of the wireless device. This allows active wireless connections to be made on behalf of both SIMs simultaneously by the sets of modem components. In a second configuration, the first set of modem components and the second set of modem components provide wireless connection service for the first SIM.

30 Claims, 3 Drawing Sheets

(56) References Cited

U.S. PATENT DOCUMENTS

| | | |
|---|---|---|
| 2011/0151858 A1 | 6/2011 | Lai |
| 2011/0151930 A1 | 6/2011 | Lee et al. |
| 2011/0237297 A1* | 9/2011 | Shin .............................. 455/558 |
| 2012/0093075 A1* | 4/2012 | Derkach et al. ............... 370/328 |
| 2012/0135715 A1 | 5/2012 | Kang et al. |

FOREIGN PATENT DOCUMENTS

| | | |
|---|---|---|
| EP | 2 384 061 A2 | 11/2011 |
| WO | WO 2010/140781 A2 | 12/2010 |
| WO | WO 2011/084963 A2 | 7/2011 |
| WO | WO 2011/140781 A1 | 11/2011 |

OTHER PUBLICATIONS

PCT International Search Report mailed Feb. 18, 2013 issued in a related PCT application No. PCT/IB2012/055886 (3 pages).

A Non-Final Office Action dated Mar. 26, 2013, which is issued in connection with U.S. Appl. No. 13/285,926, filed Oct. 31, 2011 (10 pages).

UK IPO Combined Search and Examination Report under Section 17 and 18(3) dated Feb. 27, 2012 issued in a related British Application No. GB 1118681.4 (5 pages).

PCT International Search Report issued in PCT/SB2012/057433 (date mailed Jul. 31, 2013), 3 Pages.

* cited by examiner

MODEM AND METHOD OF OPERATING A WIRELESS DEVICE

CROSS REFERENCE TO RELATED APPLICATION

This application claims benefit under 35 U.S.C. §119(a) and 37 CFR 1.55 to UK patent application no. 1121894.8, filed on Dec. 20, 2011, the entire disclosure of which is hereby incorporated by reference.

TECHNICAL FIELD

The present invention relates to a modem for a wireless device and a method of operating a wireless device.

BACKGROUND

A multi-SIM (subscriber identity module) wireless device, including particularly mobile devices such as mobile phones (including so-called "smart phones"), personal digital assistants, tablet and laptop computers, etc., can hold two or more SIM cards. Currently, such devices can typically hold two SIM cards, though phones that can hold three SIM cards are now available and it is likely that phones and other wireless devices that can hold more SIM cards will become available.

Multi-SIM operation allows the use of multiple services without the need to carry several devices at the same time. For example, in the case of a dual-SIM device, the same handset can be used for business and private use with separate numbers and bills. As another example, the same handset can be used for travel, with one SIM being for use in the home country and the other SIM being for the country visited. As another example, both SIMs may be used with the same network operator, for example to achieve a higher total bandwidth for data connections. As yet another example, the device may contain both cellular and non-cellular radios which are used for voice and data communication respectively using the different SIMs. In any event, using multiple SIMs allows the user to take advantage of different pricing plans for calls and text messages to certain destinations as well as mobile data usage, and/or to keep personal and business use separate for example, and/or to achieve higher bandwidth, and/or to obtain coverage across different networks using a single handset. With this multiple SIM functionality, the SIMs can in general be from any network operator.

There are several types of multiple SIM devices known in the prior art. For example, a Dual SIM Dual Standby device can support two SIMs, which can simultaneously use one modem. Such devices are able to camp on two networks simultaneously, allowing the user to choose which SIM they want to use. However, these devices can only support an active voice call or data session to one SIM at a time, and the unused SIM is redundant during such sessions and remains in a standby mode.

As a further example, a Dual SIM Dual Call device can support two SIMs each connected to a different modem. Such devices can support voice calls and data sessions via both SIMs simultaneously, allowing, for example, one SIM to be engaged in a call session and the other SIM to be simultaneously engaged in a data session. There is growing demand for multi-SIM devices which can support a plurality of SIMs in call/data sessions simultaneously. However, this requires a plurality of modems to connect to the plurality of SIMs. Increasing the number of modems in a wireless device can substantially increase the cost of the device, particularly if the modems are sophisticated, "high end" modems.

SUMMARY

In a first exemplary embodiment of the invention, there is a modem for a wireless device that is capable of providing service for at least two SIMs, the modem comprising at least a first set of modem components and a second set of modem components, the modem being constructed and arranged to: selectively reconfigure the arrangement of the plural sets of modem components such that, in a first configuration, the first set of modem components provides wireless connection service for a first SIM of a said wireless device and the second set of modem components provides wireless connection service for a second SIM of a said wireless device thereby allowing active wireless connections to be made on behalf of both SIMs simultaneously by the sets of modem components, and, in a second configuration, the first set of modem components and the second set of modem components provide wireless connection service for said first SIM.

There is also provided a wireless device capable of providing service for at least two SIMs, the wireless device comprising a modem as described above.

In a second exemplary embodiment of the invention, there is a method of operating a wireless device that is capable of providing service for at least two SIMs, the wireless device comprising a modem which comprises at least a first set of modem components and a second set of modem components, the method comprising: selectively reconfiguring the arrangement of the plural sets of modem components such that, in a first configuration, the first set of modem components provides wireless connection service for a first SIM of the wireless device and the second set of modem components provides wireless connection service for a second SIM of the wireless device thereby allowing active wireless connections to be made on behalf of both SIMs simultaneously by the sets of modem components, and, in a second configuration, the first set of modem components and the second set of modem components provide wireless connection service for said first SIM.

There may be at least one processor and at least one memory including computer program code, the at least one memory and the computer program code being configured to, with the at least one processor, cause the modem to operate as described above.

There is also provided a non-transitory computer-readable storage medium comprising a set of computer-readable instructions stored thereon, which, when executed by a processing system, cause the processing system to carry out a method as described above. There is also provided a computer program comprising code such that when the computer program is executed on a computing device, the computing device is arranged to carry out a method as described above.

Further features and advantages of the invention will become apparent from the following description of preferred embodiments of the invention, given by way of example only, which is made with reference to the accompanying drawings.

DETAILED DESCRIPTION

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" is often used to refer to wireless devices in general, and particularly mobile wireless devices.

Embodiments of the present invention allow a single modem to provide, when desired, simultaneous service for two SIMs of a wireless device in which the modem is installed in use, and selectively to provide the first SIM with a higher or different level of service when desired. For example, in the second configuration, the network subscription(s) of the first SIM can be used to provide voice and data calls simultaneously, or to obtain a higher data throughput than in the first configuration. The second SIM will typically not be provided with any service by the sets of modem components in the second configuration, and may for example be inactive. This arrangement allows use of the modem to be maximised, which makes efficient use of the modem whilst helping to keep down costs.

In an embodiment, at least one of the sets of modem components comprises at least one processor core and at least one radio frequency hardware component, the number of processor core(s) and radio frequency hardware component(s) in said at least one set of modem components being fixed, said at least one processor core being configured to provide control for said at least one radio frequency hardware component, and said at least one radio frequency hardware component being configured to provide dedicated radio frequency processing on behalf of the SIM for which said set of modem components is providing service. This arrangement provides a fixed physical arrangement of the processor core or cores and radio frequency hardware component or components in the at least one set of modem components. In another embodiment, at least one of the sets of modem components comprises at least one processor core and at least one radio frequency hardware component, wherein at least one of the number of processor cores and the number of radio frequency hardware components in said at least one set of modem components can be varied in use, said at least one processor core being configured to provide control for said at least one radio frequency hardware component, and said at least one radio frequency hardware component being configured to provide dedicated radio frequency processing on behalf of the SIM for which said set of modem components is providing service. This arrangement effectively provides a logical arrangement of the processor core or cores and radio frequency hardware component components in the at least one set of modem components, which can easily be varied as necessary or desired.

In an embodiment, at least one of the sets of modem components comprises dedicated baseband hardware for that set of modem components, the baseband hardware being configured to assist said at least one processor core in providing dedicated baseband processing for the SIM for which said set of modem components is providing service.

In an embodiment, the modem comprises shared baseband hardware which can selectively provide baseband processing for one or more of the sets of modem components. This shared hardware may be in addition to or instead of unshared/dedicated baseband hardware of the sets of modem components.

In an embodiment, the modem is arranged such that if a SIM of said wireless device becomes inactive, the plural sets of modem components are configured such that no set of modem components provides service for the inactive SIM and at least two sets of modem components provide service for an active SIM of said wireless device. This, maximises the service that can be provided by the modem for the active SIM(s) as desired by making sets of modem components available for other, active SIM(s) if desired.

In an embodiment, the number of sets of modem components is the same as the number of SIMs for which said wireless device can provide service, and, in one configuration, the plural sets of modem components are arranged such that each set of modem components provides wireless connection service for a different SIM of said wireless device. In this way, the wireless device is able to interact with the network of and provide service for each SIM simultaneously.

In an embodiment, the modem is arranged such that, in one configuration, all the modem components of said wireless device are arranged to provide wireless connection service for a single SIM of said wireless device. This maximises the service that can be provided for that SIM subscription, for example by providing carrier aggregation facilities to the SIM and thus increasing the maximum bandwidth or data throughput that is available.

In an embodiment, the modem is constructed and arranged to receive a user input which is used to select the configuration of the plural sets of modem components. In an embodiment, the modem is constructed and arranged to select the configuration of connections of the plural sets of modem components based on the capability of the networks corresponding to each SIM of said wireless device. The modem may therefore be arranged to allow manual selection of the desired configuration of mapping of sets of modem components to SIMs of the device according to user input, or effectively to provide some automatic selection of the desired configuration of mapping of sets of modem components to SIMs of the device according to the capability of the networks, or a combination of these and possibly other factors.

Figure 1:
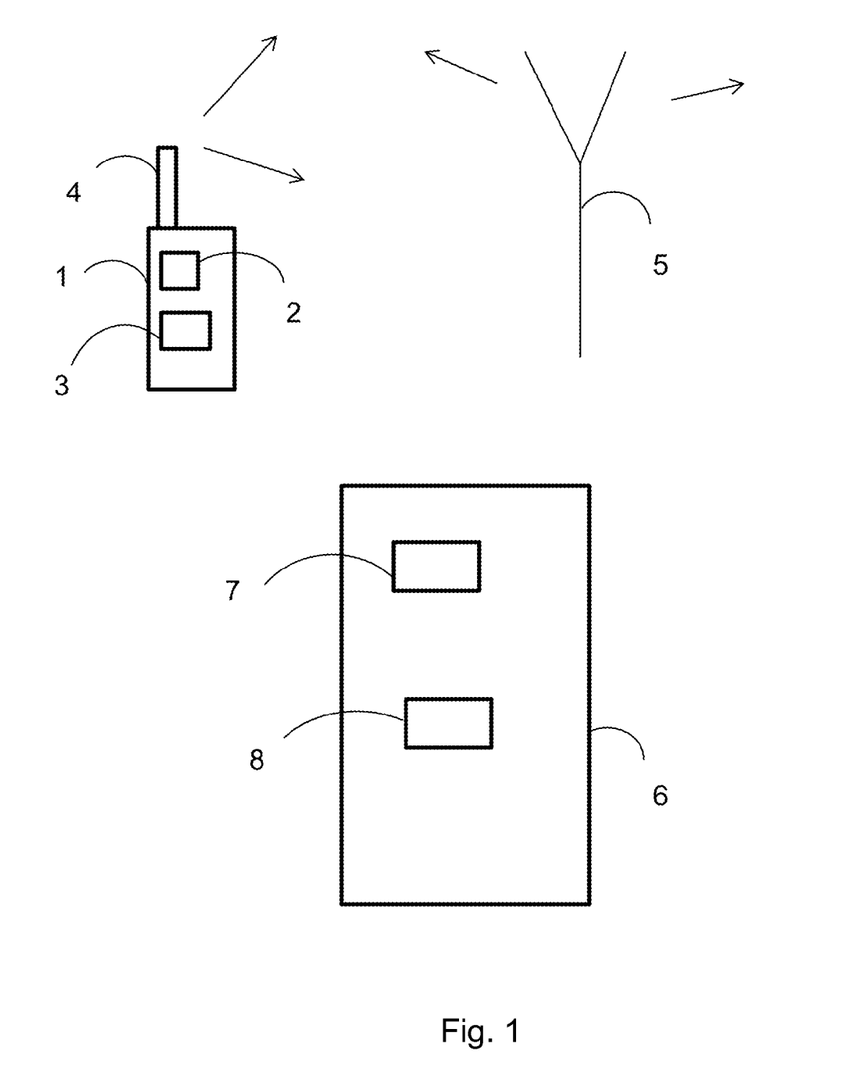
FIG. 1 shows a block diagram illustrating schematically an example of a wireless device and a wireless network.

FIG. 1 shows schematically a wireless device, in this case in the form of a mobile phone/smartphone 1. The wireless device 1 contains the necessary radio system or modem 2, processor(s) and memory/memories 3, antenna 4, etc. to enable wireless communication with the network. The wireless device 1 in use is in communication with a radio mast 5. The radio mast 5 in the example illustrated is in the form of a Node B which is in communication with a Radio Network Controller 6.

The present invention relates in general to a multi-SIM wireless device, which comprises a plurality of SIMs and a single modem, which can be arranged to enable the wireless device to communicate with the networks of each of the SIMs simultaneously.

It is mentioned here that there are proposals to replace SIM (subscriber identity module) cards with SIM functionality provided by software in the device. Reference will be made in this specification generally to "SIM" to mean that part of a device that provides for the subscriber identity module functionality whether provided by a physical card, software elsewhere in the device, or any other suitable arrangement.

Existing multi-SIM wireless devices that can interact with the networks of the multiple SIMs simultaneously typically have multiple modems, which are each connected to a respective one of the SIMs. Often these modems are required to be so-called "high-end" modems so that a user can achieve high levels of service, and in particular a high data throughput, from the networks of the SIMs. In particular, a "high-end" modem may have the capability to support high bit rates, multiple input multiple output (MIMO) and carrier aggregation. However, these high capability features are often very expensive to achieve and additionally, they are often infrequently used by the wireless device, which in general will often or for much of the time only be used for services that require a low processing capacity. In some cases, these high capability features are never fully used. Embodiments of the present invention both reduce the cost of a multi-SIM wireless device and increase the utilisation of modem hardware by sharing parts of the modem hardware between multiple SIMs.

Figure 2:
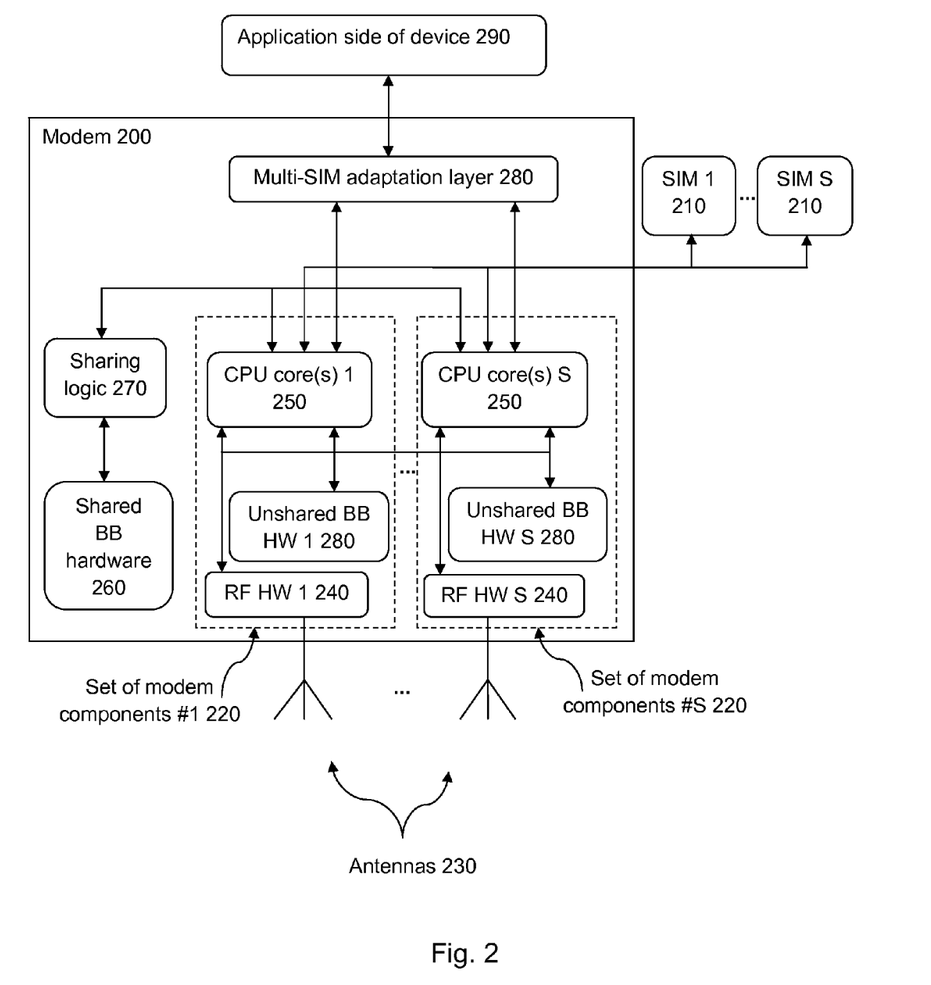
FIG. 2 shows a block diagram illustrating schematically an example of an embodiment of the present invention in one mode of operation.

FIG. 2 shows schematically an example of an embodiment of the present invention, wherein a single modem 200 of a wireless device is connected to and provides service for S SIMs 210 of the wireless device, where S is an integer greater than or equal to 2. The modem 200 is a "high end" modem, which comprises hardware and/or software/firmware that provides high capability features as mentioned above. The hardware components of the modem 200 can be grouped together into reconfigurable sets of modem components. In the example shown in FIG. 2, the modem hardware components have been grouped into S sets of modem components 220, which are connected to respective antennas 230. As will be understood from the following, this grouping of modem hardware components may be a logical grouping or a physical grouping or a mixture of logical and physical grouping. The grouping of the sets may be adjusted or reconfigured on initial set-up and/or in use for example.

The hardware components are grouped in the mode of operation shown in FIG. 2 such that each of the sets of modem components 220 comprises at least one radio frequency (RF) component 240, constructed to provide processing of the RF signals received/sent via the set's antenna 230 for the SIM channels corresponding to the respective SIMs 201. Each of the sets of modem components 220 of this example includes at least one CPU core 250, wherein the CPU core(s) 250 are part of one or more CPU sub-systems of the modem 200. Each CPU core 250 is configured to run software that is capable of providing control for the RF hardware within that set of modem components 220. In one example, the modem 200 has a single CPU sub-system that includes plural CPU cores 250, each of the sets of modem components 220 having one or more CPU cores 250 of the single CPU sub-system. In another example, the modem 200 has a plurality of CPU sub-systems, and each set of modem components 220 in effect has its own dedicated CPU sub-system, which itself may comprise one or more CPU core(s) 250. In another example, a hybrid of this arrangement is used in which a single CPU sub-system (formed of one or more CPU cores 250) provides control for two or more sets of modem components 220 whereas one or more other sets of modem components 220 have their own dedicated CPU subsystem. The or each CPU subsystem typically includes additional components such as an internal memory and/or a cache system (not shown) for the core or cores 250 of that subsystem.

In one embodiment, the modem 200 also comprises shared baseband (BB) hardware 260, which is separate from, but connected to, the sets of modem components 220. Software running on the CPU sub-system or core(s) 250 of each of the sets of modem components 220 is able to control the shared BB hardware 260. Each set of modem components 220 therefore has access to both BB and RF hardware, which can be controlled by the CPU sub-system or core(s) 250 of that set of modem components 220. The sharing of the shared BB hardware 260 between the sets of modem components 220 is facilitated by sharing logic 270, which may be in the form of either hardware or software, or a combination of both. In particular examples, the sharing of the shared BB hardware 260 is achieved by use of software or hardware techniques, such as use of semaphores, or waiting queues, etc.

In some cases, it may not be feasible or optimal to share BB hardware between some or all of the sets of modem components 220. As a particular example, sharing BB hardware may be infeasible or impractical because high processing latency requirements require the processor clock speed to be very high, which is expensive as it requires higher quality components. Thus, in an alternative embodiment, one or more of the sets of modem components 220 has its own dedicated or unshared BB hardware 280, which is not shared with the other sets of modem components 220. In this case, software running on the CPU sub-system or core(s) 250 of a particular set of modem components 220 provides control of the unshared BB hardware 280 within that set 220. Thus again, in this embodiment, each set of modem components 220 has access to BB and RF hardware and a processor to control said hardware.

In yet another embodiment, a modem 200 has both unshared BB hardware 280 within each set of modem components 220 and shared BB hardware 260 provided separately of the sets of modem components 220. Software running on the CPU sub-system or core(s) 250 of a particular set of modem components 220 provides control of both the unshared BB hardware 280 within that set 220 and the shared BB hardware 260. In yet another embodiment, only one or more of the sets of modem components 220 may have their own dedicated BB hardware 280, and also may or may not use shared BB hardware 260, whereas one or more of the sets of modem components 220 do not have their own dedicated BB hardware 280 and must use shared BB hardware 260. In a particular example, depending on the processing latency requirements of the SIMs and the required processing capacity for the SIMs, a BB hardware component may either be shared between several of the sets of modem components (for example if there are no critical latency requirements relating to the processing provided by that component) or unshared (for example if the latency requirements relating to the processing provided by that component are critical).

In one example, BB hardware may be provided by one or more hardware accelerators which help a CPU sub-system or core 250 to execute tasks that require high processing power. In another example, the BB hardware is some other type of hardware, or, in a further example, BB processing can be carried out by software running on the CPU sub-system or core 250 itself.

In one embodiment, at least some of the sets of modem components 220 are constructed and arranged in such a way that they support different pre-defined feature sets from the other sets of modem components. For example, one set of modem components 220 may support processing for 2G (second generation), 3G (third generation) and LTE (Long Term Evolution) networks, whereas another set of modem components 220 may support processing for 2G and 3G networks only. In general, LTE networks require higher end components than 2G and 3G networks and thus hardware costs can be balanced against the desired or required functionality of the modem 200. As another example, one set of modem components may support MIMO (multiple input multiple output) and another modem component may only support SISO (single input single output). As a further example, some sets of modem components 220 may support a feature set that allows them to be combined with another such set of modem components 220 in order to support carrier aggregation, whereas another set of modem components 220 may support a "lower-end" feature set, which for example cannot support carrier aggregation even when combined with another set of modem components 220. These "lower end" components may be included even though they cannot for example be usefully combined to provide carrier aggregation because, in general, they are cheaper than the "higher end" components that can provide carrier aggregation when combined and they can still provide basic baseband and radio frequency processing. In addition, the processing powers of different CPU subsystems and/or CPU cores 250 can then be different based on the predefined need. Again, hardware costs can be balanced against the functionality or feature sets desired or required of the modem 200 as a whole.

In use, the modem 200 can be shared between several SIMs 210 of the wireless device. In one particular example, the modem may be shared between two SIMs 210 by a first of the two SIMs 210 using at least a first set of modem components 220 and the second SIM 210 using at least a second set 220. In this way, the wireless device is able to engage in two active services, such as two active voice calls or two active data calls or an active voice call and an active data call, on behalf of the two connected SIMs 210 simultaneously, or can use MIMO or carrier aggregation say, wherein at least a part of the processing for each of these simultaneous active services occurs simultaneously in the cores 250 of the respective sets of modem components 220 and in embodiments without the operation for one SIM 210 affecting the operation for the other SIM(s) 210. In general, each set of modem components 220 can be connected to no more than one SIM 210 at any one time because the hardware within the sets of modem components is unshared hardware. Thus, a modem 200 which is grouped into M sets of modem components 220 can be shared by S SIMs 210 provided S≤M.

As indicated above, a SIM 210 may be connected to more than one set of modem components 220. If a SIM 210 is connected to more than one set of modem components 220, the network of that SIM 210 will have access to a greater number of modem components than it would have were it connected to just one of those sets 220. Thus, the network of a SIM 210 would in general have access to a greater RF processing capacity, and also, in some cases, a greater BB processing capacity, as well as providing greater bandwidth, when connected to more than one set of modem components 220 than if it were connected to just one of those sets of modem components 220.

Each set of modem components 220 is also connected to a multi-SIM adaptation layer 280, which provides an interface between the application side of the wireless device 290 and the hardware of the modem 200. This allows the application side 290 to establish a connection/connections with a network/networks of a connected SIM(s) 210 via one or more sets of modem components 220. In FIG. 2, this adaptation layer 280 is shown schematically to be executed by separate hardware in the modem 200. However in other embodiments, this application layer 280 could instead be executed by the application side of the device 290 or alternatively by one or more of the CPU sub-systems 250, or by any other suitable arrangement.

FIG. 2 shows the hardware components of the modem 200, the SIMs 210, the multi-SIM adaptation layer 280 and the application side of the device 290 to be interconnected. These connections provide data (including voice and non-voice data) and/or control flow between these components. The SIMs 210 may be connected to one or more CPU sub-systems or cores 250 via these connections, and consequently to one or more sets of modem components 220. These connections further allow the CPU sub-system or core(s) 250 of a particular set of modem components 220 to control the RF hardware 240 and any (unshared) BB hardware 280 within that set 220.

Additionally, each CPU core 250 of each set of modem components 220 is preferably connected to all shared BB hardware components 260 via data and/or control flow connections as shown, with the CPU cores 250 being able to receive interrupts from all BB or RF hardware components. This provides the CPU sub-systems 250 with access to resources from the shared BB hardware 260 via sharing methods such as semaphores, waiting queues, etc. Moreover, the grouping of the hardware components into sets 220 as shown schematically in FIG. 2 may be a physical grouping or a logical grouping, and in general these groupings may be changed in use as required. As just one example, a particular CPU core 250 may in one configuration be part of one set of modem components 220, whereas it may be part of a different set of modem components 220 (possibly operating in conjunction with another CPU core 250) in another configuration. Similar considerations apply to the various other hardware components of the sets of modem components 220.

In preferred embodiments, the connections between the SIMs 210 of the wireless device and the sets of modem components 220 are configurable. Different configurations will provide different BB and/or RF processing capacities in the wireless device to the networks of the SIMs 210. There are three main factors that affect this processing. First, the greater the number of sets of modem components 220 a SIM 210 is connected to, the higher the RF processing capacity available to process signals to be sent to and/or received from the network of that SIM 210. If the sets of modem components 220 also comprise BB hardware, then a greater number of modem components will similarly provide a higher BB processing capacity. Secondly, as discussed, different sets of modem components 220 may have different feature sets, so switching connection of a SIM 210 from a first set of modem components 220 to a second set of modem components 220 may change the BB and RF processing capacity available to process signals to or from the network of that SIM 210. Finally, the amount of shared BB hardware 260 used by a particular set of modem components 220 which is connected to a particular network will affect the BB processing capacity available for transmissions to and from that network.

In one specific example, there are two SIMs 210 and two sets of modem components 220. In one particular configuration or mode, a first set of modem components 220 provide service for a first SIM 210, and the second set of modem components 220 provide service for the second SIM 210. The networks of the first and second SIMs 210 each therefore have access to independently controlled BB and RF processing and thus, in this configuration, it can be considered that the single modem 200 is able to fulfil the role of two separate modems, each providing service for a respective SIM 210, thus allowing the device to interact with two networks by sustaining two active connections simultaneously. If the modem 200 comprises shared BB hardware 260, but no unshared hardware 280 in the sets of modem components 220, then each of the two sets of modem components 220 will have to share the shared BB hardware 260 in order to carry out BB processing on behalf of the SIMs 210. However, if the modem comprises both shared 260 and unshared 280 BB hardware, then it may again be that both sets of modem components 220 share the shared BB hardware 260, or alternatively it may be that one of the sets of modem components 220 uses only its unshared BB hardware 260 and the set of modem components 220 that uses the shared BB hardware 260 will have higher BB processing capabilities than the other set of modem components 220.

In another configuration or mode, the first SIM 210 may instead be connected to both sets of modem components 220, which both work cooperatively to provide BB and RF processing for the network of the first SIM 210. In this case, the second SIM 210 would be connected to neither sets of modem components 220. In this configuration, the modem 200 can be considered to fulfil the role of a single modem which has a higher processing capability than each of the "two modems" of the first configuration, but which only allows the wireless device to interact with the network of the first SIM 210.

As a further example of a case in which it may be useful to reconfigure the connections between SIMs 210 and sets of modem components 220, one set of modem components 220 has a feature set which supports high bit rate calls, whereas a second set of modem components 220 has a feature set which only allows it to support much lower bit rate calls. Arranging for the first set of modem components 220 to provide service for a particular SIM 210 will allow the device to achieve much higher bit rate calls via the network of that SIM 210 than it would if that SIM 210 were connected to the second set of modem components 220.

FIG. 2 further shows that each CPU sub-system or core 250 has access to resources from all BB and RF hardware 280,240 in all the other sets of modem components 220 and any shared BB hardware 260. This means that if for example one SIM 210 is connected to two sets of modem components 220, the CPU subsystem(s) can arrange the processing such that the CPU core(s) 250 of the two sets of modem components 220 coordinate BB and RF processing between the two sets of modem components 220 and accordingly divide processing tasks between the BB and RF hardware 280,240 of those two sets 220. These connections also facilitate Symmetric Multiprocessing (SMP) by the CPU core(s) 250 of different sets of modem components 220 as discussed in more detail below.

In a particular example, just two SIMs 210 are connected to a modem 200, which is made up of two sets of modem components 220 and some shared baseband hardware 260. In a "dual SIM mode", the modem 200 can provide service for both of the SIMs 210 simultaneously, and in this mode, a first of the two SIMs 210 is connected to a first of the two sets of modem components 220 and the second SIM 210 is connected to the second set of modem components 220. In this mode, the first set of modem components provides dedicated RF processing and dedicated baseband processing of all layers 1 to 3 (L1 to L3) for the network of the first SIM 210. This is achieved in one example by providing or grouping the first set of modem components such that it contains one or more RF hardware components 240, one or more unshared baseband hardware components 280 which provide L1 processing, and one or more separate unshared baseband hardware components 280 which provide L2 and L3 processing. Similarly the second set of modem components 220 provides dedicated RF processing and dedicated baseband processing of all layers 1 to 3 (L1 to L3) for the network of the second SIM 210. Again, this is achieved in one example by providing or grouping the second set of modem components 220 such that it contains one or more RF hardware components, one or more unshared baseband hardware component 280, which provide L1 processing, and one or more separate unshared baseband hardware components 280, which provide L2 and L3 processing. Additionally, one or both of the first and second sets of modem components may optionally make use of the shared baseband hardware. This shared baseband hardware may include components that provide processing for any or a number of the layers L1 to L3.

The modem 200 may also operate in a "single SIM mode", where one of the SIMs 210 is disconnected and the other SIM 210 is connected to both of the two sets of modem components 220. In one example shown schematically in FIG. 3, in this mode, processing tasks may be divided such that one CPU subsystem or core(s) 250 provides control for the RF hardware of both sets of modem components 241 and additionally uses the unshared L1 baseband hardware components of both sets of modem components 281. The other CPU subsystem or core(s) 250, on the other hand, provides control for and uses the unshared L2 and L3 baseband hardware components from both the first and second sets of modem components 282. As in the "dual SIM mode", the shared baseband hardware 260 may include components that provide processing for any or a number of the layers L1 to L3. The first CPU subsystem or core(s) 250 can optionally use any L1 baseband hardware within the shared baseband hardware 260 to provide greater L1 processing capacity to the network of the connected SIM, and similarly, the other CPU subsystem or core(s) 250 can optionally use any L2 and/or L3 baseband hardware within the shared baseband hardware 260 to provide greater L2 and/or L3 processing capacity to the network of the connected SIM 210.

Figure 3:
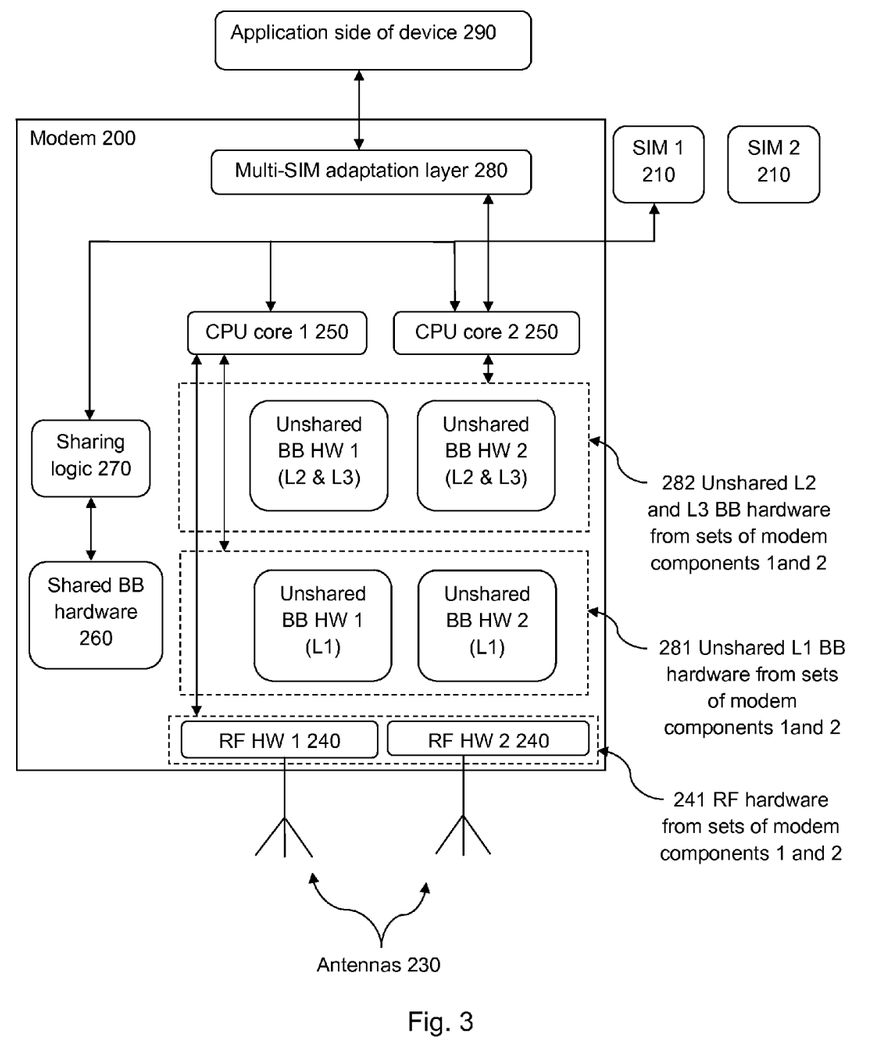
FIG. 3 shows a block diagram illustrating schematically an example of an embodiment of the present invention in another mode of operation.

In the above example, the processing tasks were divided between the two or more CPU subsystems or core(s) 250 according to Open Systems Interconnection (OSI) model layers. However, a person skilled in the art will understand that there are other ways in which processing tasks can be divided between the different CPU subsystems or cores(s) 250 of different sets of modem components 220. Being able to divide processing tasks in different ways, which can be reconfigured in use as and when needed, provides a modem 200 that is very flexible. Enhanced operations, such as multi-carrier or multi-band services, can be provided for a SIM 210 by having service provided for that SIM 210 by multiple sets of modem components 220.

In a particular example, where processing tasks are divided differently between different CPU subsystems or cores(s) 250 of different sets of modem components to achieve multi-carrier features, a wireless device has a single modem 200 having two sets of modem components 220 and two SIMs 210. The wireless device may or may not have shared BB hardware 260, but in any case, whether by using shared 260 or unshared 280 BB hardware, or a combination or different combinations of the two, the sets of modem components 220 are constructed such that they are capable of executing cellular protocol functionality related to reception and transmission on a single carrier. In one configuration, each SIM 210 is arranged to use a respective one of the sets of modem components 220 and thus the wireless device is able to send and receive single carrier signals to and from two networks simultaneously. However, in a different configuration, one SIM 210 is arranged to use both sets of modem components 220 and the other SIM 210 is not used or is inactive. In this configuration, the wireless device can send and receive dual carrier signals, but only on the network of the active SIM 210. In summary, in the single-connected SIM configuration, the modem 200 is able to provide a network with access to higher processing capacity (and consequentially higher capability features) than in the dual-connected SIM configuration, but at the expense of the number of networks with which the device can simultaneously interact. Switching from the single-connected SIM configuration to the dual-connected SIM configuration is achieved in one example by running software, which supports both the single-carrier and multi-carrier features, on the CPU core(s) 250 of both of the sets of modem components 220. In this case, methods for symmetric multi-processing (SMP) can be used to divide the processing between the CPU core(s) of the two sets of modem components 220 as discussed above, preferably using a single CPU subsystem composed of the CPU cores 250 of the two sets of modem components. To achieve SMP, each CPU subsystem or core 250 necessarily has access to all BB and RF hardware, and the operating system distributes tasks between the CPU subsystems or cores 250 and controls which hardware component(s) each CPU subsystem or core 250 uses. In an alternative example, the CPU sub-system or core(s) 250 of each of the two sets of modem components 220 run two different versions of control software, where the first version supports the single-carrier configuration and the second version divides functionality over all of the CPU cores 250, thus supporting the multi-carrier configuration.

Thus, in one embodiment, the modem 200 can be regarded as providing a resource pool of hardware components, which can be grouped together in different ways as necessary or desirable. This resource pool of hardware components can be distributed between a number of SIMs 210 by connecting one or more sets of modem components 220 to each of the number of SIMs 210. Additionally, there may be shared baseband hardware 260 within the modem 200, which is not grouped into any set of modem components 220, but instead is shared between a number of sets of modem components, such that the different CPU subsystem or core(s) 250 of each of the sets of modem components 220 has access to resources from the shared baseband hardware 260.

As can be seen, the configuration of the connections between the SIMs 210 and the sets of modem components 220 can greatly affect the processing capacity available to the network of each SIM 210. The number of sets of modem components 220 and/or which sets of modem components 220 provide service for a particular SIM 210, as well as the amount of shared BB hardware 260 used for each SIM 210, can be determined according to one or more of a number of criteria. Such criteria may be, for example, the capabilities of the networks of the SIMs 210, the subscription capabilities of the SIMs 210, the minimum data throughput required by each SIM 210, user input and the services required on the SIMs 210.

In one arrangement, sets of modem components 220 may be arranged to provide service for the SIMs 210 according to the feature sets supported by the set of modem components 220 and the capabilities of the networks of the SIMs 210. In a particular example, the number of SIMs 210 may be equal to the number of sets of modem components 220 and it may be decided that each SIM is to be serviced by a different set of modem components 220. In this case, the SIM 210 with the network that supports the highest quality of service may be serviced by the set of modem components 220 with the highest processing capacity, whereas the SIM 210 with the network that supports the lowest quality of service may be serviced by the set of modem components 220 with the lowest processing capacity. All other SIMs may be serviced in a similar way, such that SIMs 210 with networks that support successively lower qualities of service are serviced by sets of modem components 220 that have successively lower processing capacities.

In another arrangement, the SIM 210 with the highest quality of service may be identified by considering both the network capabilities and, additionally, the SIM subscription capabilities of all the SIMs 210. Furthermore, it may be that, instead of enforcing that all SIMs 210 must be serviced by at least one set of modem components 220, some of the SIMs 210 may be allowed to be inactive. Thus, in one particular example, it may be that all of the SIMs 210 except the identified SIM 210 may be inactive and disconnected from all sets of modem components 220, and all of the sets 220 may then be connected to provide service for the identified SIM 210, thus providing that SIM 210 with the highest possible data throughput. In this case, all of the disconnected SIMs 210 are forced to be inactive, even if they were previously carrying out activities on their network. Thus in another embodiment, the minimum data throughput required by each SIM 210 is also considered. This means that any inactive SIMs 210 will be disconnected, but all active SIMs 210 will remain connected to at least the minimum number of sets of modem components 220 that will enable the SIMs 210 to obtain their desired service levels. The identified SIM 210 can then be serviced by any spare sets of modem components 220, thus providing that SIM 210 with the highest possible data throughput, whilst taking into account the minimum data throughput of the other SIMs 210.

As a specific example, there are four sets of modem components 220 and four SIMs 210. It is identified that two of these SIMs 210 are inactive, and thus do not require a connection to any set of modem components 220, whereas the other two SIMs 210 require connection to at least one set of modem components 220. The network of a first of the two active SIMs 210 is an LTE network, and the network of the second active SIM 210 is a GSM network. LTE networks, in general, support higher qualities of data services than GSM networks, and thus, in this case, the second SIM 210 may be serviced by its minimum requirement of one set of modem components 220, and the first SIM may be serviced by the remaining three sets of modem components 220.

In a further embodiment, the configuration may be decided entirely, or at least partially, according to user input. As an example, a user may decide that they want to use a particular SIM 210 for a data service because, for example, the subscription of that SIM provides the cheapest data services. Thus the user may decide that they want all sets of modem components 220 to service that SIM 210 to provide the highest possible data throughput to the network of that SIM 210, and thus, in this case, all other SIMs 210 would be inactive. Alternatively, the user may again decide that they want the highest possible data throughput to be available to the network of that SIM 210 having the cheaper tariff, but the device may also determine that a number of other SIMs 210 have a minimum data throughput that must be met. In this case, all SIMs 210 will be provided with a sufficient number of sets of modem components 220 to meet these requirements before any remaining sets of modem components 220 are connected to service the user-selected SIM 210.

It will be understood that any combination of the above embodiments may be used to configure the connection between sets of modem components 220 and SIMs 210. Additionally, if the modem 200 comprises shared BB hardware 260, such considerations would also be made when determining how much of the shared BB hardware 260 is used by each of the SIMs 210. Power usage by the device may be a factor in determining what configuration to use for the various sets of modem components 220.

If any of these criteria change, for example if a user decides that they would like a high data throughout to be provided to the network of a different SIM 210, or if the capability of a network of a SIM 210 changes, or if a SIM 210 of the device becomes inactive, then the connection configuration can be changed on the fly without having to power down the wireless device. In general, care will need to be taken to keep the network(s) correctly informed of the capability of the wireless device as that capability is changed.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the or each processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A modem for a wireless device that is capable of providing service for at least two Subscriber Identity Modules (SIMs), the modem comprising a plurality of sets of modem components including at least a first set of modem components and a second set of modem components, the modem being configured to:
    selectively reconfigure data and/or control flow between the at least two SIMS and the plurality of sets of modem components such that,
        in a first configuration, the first set of modem components provides wireless connection service for a first SIM of said wireless device and the second set of modem components provides wireless connection service for a second SIM of said wireless device thereby allowing active wireless connections to be made on behalf of both the first and second SIMs simultaneously by the first and second sets of modem components, and,
        in a second configuration, both the first set of modem components and the second set of modem components simultaneously provide an active wireless connection service for the first SIM.

2. A modem according to claim 1, wherein at least one of the sets of modem components comprises at least one processor core and at least one radio frequency hardware component, the number of processor cores and radio frequency hardware components in said at least one set of modem components being fixed, said at least one processor core being configured to provide control for said at least one radio frequency hardware component, and said at least one radio frequency hardware component being configured to provide dedicated radio frequency processing on behalf of the SIM for which said set of modem components is providing service.

3. A modem according to claim 1, wherein at least one of the sets of modem components comprises at least one processor core and at least one radio frequency hardware component, wherein at least one of the number of processor cores and the number of radio frequency hardware components in said at least one set of modem components can be varied in use, said at least one processor core being configured to provide control for said at least one radio frequency hardware component, and said at least one radio frequency hardware component being configured to provide dedicated radio frequency processing on behalf of the SIM for which said set of modem components is providing service.

4. A modem according to claim 1, wherein at least one of the sets of modem components comprises dedicated baseband hardware for that set of modem components, the baseband hardware being configured to assist said at least one processor core in providing dedicated baseband processing for the SIM for which said set of modem components is providing service.

5. A modem according to claim 1, wherein the modem comprises shared baseband hardware which can selectively provide baseband processing for one or more of the sets of modem components.

6. A modem according to claim 1, wherein the modem is configured such that if a SIM of said wireless device becomes inactive, the plurality of sets of modem components are configured such that no set of modem components provides service for the inactive SIM and at least two sets of modem components provide service for an active SIM of said wireless device.

7. A modem according to claim 1, wherein the number of sets of modem components is the same as the number of SIMs for which said wireless device can provide service, and, in one configuration, the plurality of sets of modem components are configured such that each set of modem components provides wireless connection service for a different SIM of said wireless device.

8. A modem according to claim 1, wherein the modem is configured such that, in one configuration, all the modem components of said wireless device are configured to simultaneously provide wireless connection service for a single SIM of said wireless device.

9. A modem according to claim 1, wherein the modem is configured to receive a user input which is used to select the configuration of the plurality of sets of modem components.

10. A modem according to claim 1, wherein the modem is configured to select the configuration of connections of the plurality of sets of modem components based on the capability of the networks corresponding to each SIM of said wireless device.

11. A modem according to claim 1, wherein each of the first and second sets of modem components includes a radio frequency hardware component.

12. A modem according to claim 1, wherein each of the first and second sets of modem components includes a central processing unit core.

13. A modem according to claim 1, wherein each of the first and second sets of modem components includes unshared baseband hardware.

14. A modem according to claim 1, further comprising a plurality of antennas, a respective one of the antennas being connected to each of the sets of modem components.

15. A wireless device capable of providing service for at least two SIMs, the wireless device comprising a modem according no claim 1.

16. A method of operating a wireless device that is capable of providing service for at least two Subscriber Identity Modules (SIMs), the wireless device comprising a modem which comprises a plurality of sets of modem components including at least a first set of modem components and a second set of modem components, the method comprising:
    selectively reconfiguring data and/or control flow between the at least two SIMS and the plurality of sets of modem components such that,
        in a first configuration, the first set of modem components provides wireless connection service for a first SIM of the wireless device and the second set of modem components provides wireless connection service for a second SIM of the wireless device thereby allowing active wireless connections to be made on behalf of both the first and second SIMs simultaneously by the first and second sets of modem components, and,
        in a second configuration, both the first set of modem components and the second set of modem components simultaneously provide an active wireless connection service for the first SIM.

17. A method according to claim 16, wherein at least one of the sets of modem components comprises at least one processor core and at least one radio frequency hardware component, the number of processor cores and radio frequency hardware components in said at least one set of modem components being fixed, said at least one processor core being configured to provide control for said at least one radio frequency hardware component, and said at least one radio frequency hardware component being configured to provide dedicated radio frequency processing on behalf of the SIM for which said set of modem components is providing service.

18. A method according to claim 16, wherein at least one of the sets of modem components comprises at least one processor core and at least one radio frequency hardware component, wherein the number of processor cores and/or the number of radio frequency hardware components in said at least one set of modem components can be varied in use, said at least one processor core being configured to provide control for said at least one radio frequency hardware component, and said at least one radio frequency hardware component being configured to provide dedicated radio frequency processing on behalf of the SIM for which said set of modem components is providing service.

19. A method according to claim 16, wherein at least one of the sets of modem components comprises dedicated baseband hardware for that set of modem components, the baseband hardware being configured to assist said at least one processor core in providing dedicated baseband processing for the SIM for which said set of modem components is providing service.

20. A method according to claim 16, wherein the modem comprises shared baseband hardware which can selectively provide baseband processing for one or more of the sets of modem components.

21. A method according to claim 16, further comprising configuring the plurality of sets of modem components such that, if a SIM of the wireless device becomes inactive, no set of modem components provides service for the inactive SIM and at least two sets of modem components provide service for an active SIM of said wireless device.

22. A method according to claim 16, wherein the number of sets of modem components is the same as the number of SIMs for which said wireless device can provide service, the method further comprising configuring the plurality of sets of modem components such that each set of modem components provides wireless connection service for a different SIM of said wireless device.

23. A method according to claim 16, further comprising configuring the plurality of sets of modem components such that, in one configuration, all the modem components of said wireless device are configured to simultaneously provide wireless connection service for a single SIM of said wireless device.

24. A method according to claim 16, further comprising selecting the configuration of the plurality of sets of modem components based on user input received by the modem.

25. A method according to claim 16, further comprising selecting the configuration of the plurality of sets of modem components based on the capability of the networks corresponding to each SIM of said wireless device.

26. A method according to claim 16, wherein each of the first and second sets of modem components includes a radio frequency hardware component.

27. A method according to claim 16, wherein each of the first and second sets of modem components includes a central processing unit core.

28. A method according to claim 16, wherein each of the first and second sets of modem components includes unshared baseband hardware.

29. A method according to claim 16, further comprising connecting a respective antenna to each of the sets of modem components.

30. A non-transitory computer-readable storage medium comprising a set of computer-readable instructions stored thereon, which, when executed by a processing system, cause the processing system to carry out a method according to claim 16.

* * * * *